US007177150B2

(12) United States Patent
Kazuhiro

(10) Patent No.: US 7,177,150 B2
(45) Date of Patent: Feb. 13, 2007

(54) ADJUSTABLE FLAT-TYPE COOLING DEVICE

(75) Inventor: Kitagawa Kazuhiro, San-Chung (TW)

(73) Assignee: Scythe Taiwan Co., Ltd., Taipei (TW)

( * ) Notice: Subject to any disclaimer, the term of this patent is extended or adjusted under 35 U.S.C. 154(b) by 309 days.

(21) Appl. No.: 10/950,529

(22) Filed: Sep. 28, 2004

(65) Prior Publication Data

US 2006/0073046 A1   Apr. 6, 2006

(51) Int. Cl.
  *H05K 7/20* (2006.01)
  *H05K 5/00* (2006.01)
  *F04B 35/04* (2006.01)
  *F16M 11/00* (2006.01)

(52) U.S. Cl. ............ 361/695; 361/687; 361/688; 361/694; 454/184; 417/423.14; 417/423.15; 248/676

(58) Field of Classification Search ........ 361/694–695; 454/184; 417/423.15
See application file for complete search history.

(56) References Cited

U.S. PATENT DOCUMENTS

| 5,862,037 | A * | 1/1999 | Behl ................... 361/687 |
| 6,181,554 | B1 * | 1/2001 | Cipolla et al. ........... 361/687 |
| 6,239,971 | B1 * | 5/2001 | Yu et al. ............... 361/695 |
| 6,266,243 | B1 * | 7/2001 | Tomioka ............... 361/695 |
| 6,353,536 | B1 * | 3/2002 | Nakamura et al. ........ 361/686 |
| 6,414,842 | B1 * | 7/2002 | Cipolla et al. ........... 361/687 |
| 6,542,360 | B2 * | 4/2003 | Koizumi ............... 361/687 |
| 6,646,874 | B2 * | 11/2003 | Pokharna et al. ......... 361/687 |
| 6,707,668 | B2 * | 3/2004 | Huang ................. 361/687 |
| 6,754,072 | B2 * | 6/2004 | Becker et al. ........... 361/687 |
| 6,781,833 | B2 * | 8/2004 | Lu .................... 361/695 |
| 6,894,896 | B2 * | 5/2005 | Lin .................... 361/695 |
| 7,019,968 | B2 * | 3/2006 | Kitahara ............... 361/695 |
| 7,038,909 | B1 * | 5/2006 | Chen .................. 361/687 |
| 2005/0213302 | A1 * | 9/2005 | Lin .................... 361/695 |

* cited by examiner

Primary Examiner—Lisa Lea-Edmonds
Assistant Examiner—Zachary Pape
(74) Attorney, Agent, or Firm—Troxell Law Office, PLLC

(57) ABSTRACT

An adjustable flat-type cooling device includes a flat-type cooling fan assembly, two X-directional adjusting feet symmetrically located at two lateral sides of the cooling fan assembly, and two Y-directional supporting feet slidably received in each of the two X-directional adjusting feet. The X-directional adjusting feet and the Y-directional supporting feet together define a bottom surface for bearing against a horizontal supporting surface, and a top surface for a heat-producing apparatus to rest thereon. The cooling fan assembly could be adjusted to a position closest to a heat source of the heat-producing apparatus by pulling the X-directional adjusting feet and the Y-directional supporting feet to different extended positions; so as to provide best cooling effect. The adjustable flat-type cooling device requires only one cooling fan and therefore has an effectively reduced manufacturing cost.

8 Claims, 8 Drawing Sheets

ADJUSTABLE FLAT-TYPE COOLING DEVICE

FIELD OF THE INVENTION

The present invention relates to an adjustable flat-type cooling device, and more particularly to an adjustable flat-type cooling device suitable for using below a heat-producing apparatus, such as a notebook computer, and having a cooling fan adjustable to a position closest to a heat source of the heat-producing apparatus to provide excellent cooling effect.

BACKGROUND OF THE INVENTION

While the currently available computer apparatus operate at faster speed to process huge amount of data over a prolonged time, their internal components, particularly the central processing unit (CPU), inevitably produce a large amount of heat and accordingly high temperature to adversely affect the normal function of the computer apparatus. Therefore, a cooling device, such as a cooling fan, would usually be provided to lower the high temperature of a desktop computer during operation thereof.

Since the above-mentioned conventional cooling device usually includes a driving motor and a relatively thick cooling fan to have a specific volume, it is not suitable for mounting in a portable notebook computer that must be compact and light to enable convenient carrying thereof. Therefore, when it is desired to dissipate heat produced by the notebook computer, an external cooling device must be additionally provided at a position as close as possible to a heat source of the notebook computer.

One of the most common external cooling devices is a cooling fan with feet. The feet are connected to a housing of the cooling fan to support the whole cooling fan thereon, so that the cooling fan could be positioned in the vicinity of the notebook computer to blow away heat produced by the operating notebook computer. However, since the cooling fan is positioned in the vicinity of the notebook computer instead of at a main heat source of the computer, such as the CPU, it has a relatively poor cooling effect.

A flat-type cooling fan assembly is a somewhat improved external cooling device, and has a flat main body with a specific area and volume suitable for the notebook computer to rest thereon. More than one cooling fan is provided in the flat main body to suck and expel heat produced by the notebook computer during operation thereof. Generally speaking, the flat-type cooling fan assembly effectively lowers the temperature at the bottom of the notebook computer. However, the multiple cooling fans included in the main body disadvantageously increase the cost of the whole cooling fan assembly. Moreover, the cooling fans in the main body are located at fixed positions that do not necessarily correspond to the main heat source to effectively dissipate the produced heat.

SUMMARY OF THE INVENTION

A primary object of the present invention is to provide an adjustable flat-type cooling device having a flat-type cooling fan assembly adjustable to different positions below a notebook computer closest to a heat source of the computer, and therefore providing excellent cooling effect.

Another object of the present invention is to provide an adjustable flat-type cooling device requiring only one flat-type cooling fan assembly that is adjustable to different positions below a notebook computer, and therefore having a reduced manufacturing cost.

To achieve the above and other objects, the adjustable flat-type cooling device of the present invention mainly includes a flat-type cooling fan assembly, two X-directional adjusting feet symmetrically located at two lateral sides of the cooling fan assembly, and two Y-directional supporting feet slidably received in each of the two X-directional adjusting feet. The X-directional adjusting feet and the Y-directional supporting feet together define a bottom surface for bearing against a horizontal supporting surface, and a top surface for a heat-producing apparatus to rest thereon.

In a preferred embodiment of the present invention, the flat-type cooling fan assembly includes a substantially square cooling fan enclosed in a space defined by and between an upper and a lower cover that are closed to each other. The upper and the lower cover are correspondingly provided at respective inner sides with two sets of X-directional ribs, which together define a framed space therebetween to match sizes of the cooling fan. A slide way is formed in the space of the cooling fan assembly between each rib and an adjacent X-directional side of the upper and lower covers. Two notches are diagonally formed at two Y-directional sides of each of the upper and the lower cover to communicate with the slide ways for the two X-directional adjusting feet to insert into the slide ways via the notches.

In the preferred embodiment of the present invention, each of the X-directional adjusting feet consists of an upper and a lower hollow housing, which together define between them an inner space having predetermined dimensions for accommodating necessary electronic elements therein. Each of the X-directional adjusting feet is also provided at two longitudinally opposite ends at joints of the upper and the lower hollow housing with two insertion openings for the Y-directional supporting feet to insert thereinto, at an outer side with a socket opening, and at an inner side near the two longitudinally opposite ends separately with a high and a low slider inward extended in X-direction. The high and the low slider are provided at a free end with a downward and an upward protrusion, respectively. Two pieces of X-directional slide guides are separately located in the slide ways formed in the cooling fan assembly. Each of the X-directional slide guides includes two parallelly arranged guide slots having a predetermined length, and two through holes provided near two diagonally opposite corners thereof. The downward and upward protrusions near free ends of the high and low sliders are separately slidably engaged with one of the guide slots on the two X-directional slide guides.

A Y-directional slide guide is mounted in the inner space defined by the upper and the lower housing of each X-directional adjusting foot. The Y-directional slide guide is structurally similar to the X-directional slide guides to have two parallelly arranged slide slots of a predetermined length and two through holes provided near two diagonally opposite corners thereof. Each of the Y-directional supporting feet includes a slider that is extended into the inner space of the X-directional adjusting foot via one of the insertion openings provided at two longitudinally opposite ends of the X-directional adjusting foot, and the slider of each Y-directional supporting foot is provided near a free end with a protrusion for slidably engaging with one of the two parallel slide slots on the Y-directional slide guide. Each of the Y-directional slide guides is located in Y-direction in the inner space defined between the hollow upper and lower housing of each X-directional adjust foot by engaging the two diagonally opposite through holes on the Y-directional slide guide with complementary coupling elements correspondingly provided in the hollow upper and lower housings of the X-directional adjusting foot.

In the preferred embodiment of the present invention, the X-directional adjusting feet have bottom surfaces adapted to flatly bear against a horizontal supporting surface, and top surfaces suitable for a notebook computer to rest thereon.

Each of the X-directional adjusting feet has an overall height larger than an overall thickness of the flat-type cooling fan assembly, such that clearances allowing air circulation are left above an upper surface and below a lower surface of the cooling fan assembly when the adjustable flat-type cooling device is disposed between the notebook computer and the supporting surface.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
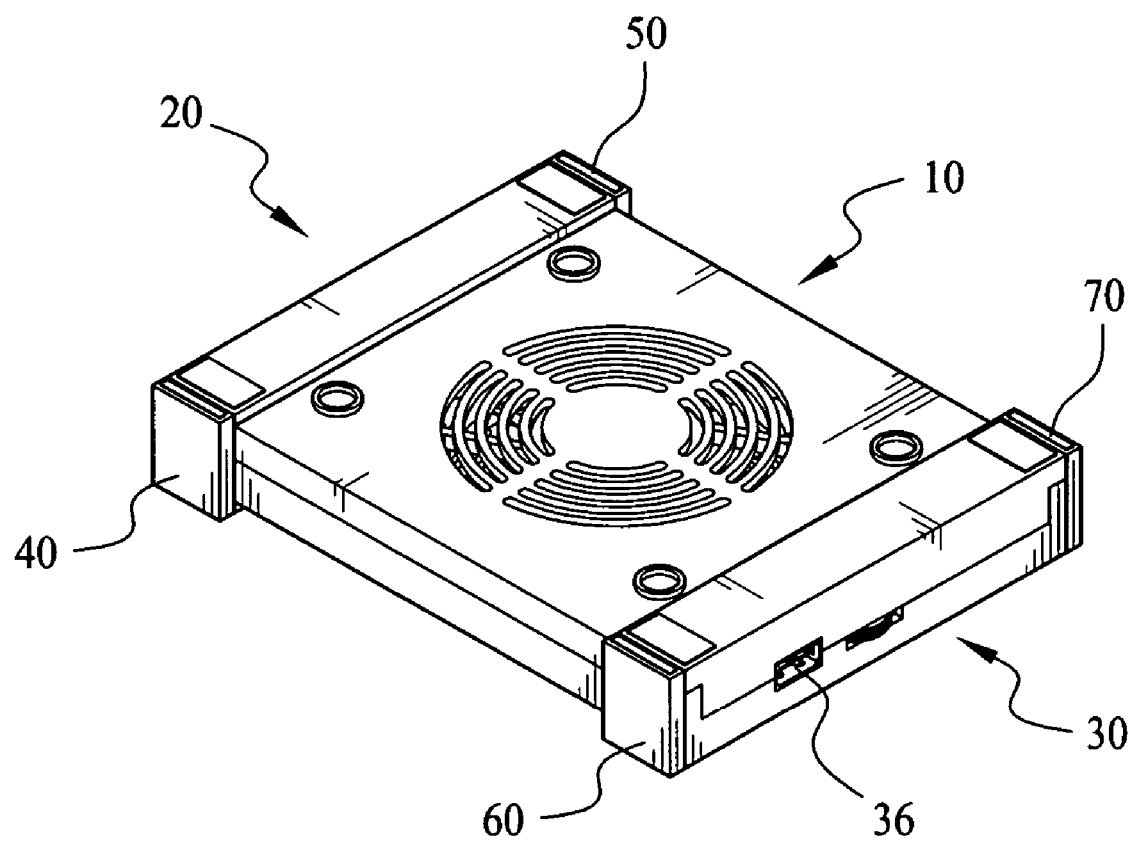
FIG. 1 is an assembled perspective view of an adjustable flat-type cooling device according to a preferred embodiment of the present invention.

Please refer to FIG. 1 that is an assembled perspective view of an adjustable flat-type cooling device according to a preferred embodiment of the present invention. As shown, the present invention mainly includes a flat-type cooling fan assembly 10, two X-directional adjusting feet 20, 30 symmetrically located at two lateral sides of the cooling fan assembly 10, and two sets of Y-directional supporting feet 40, 50 and 60, 70 slidably received in the two X-directional adjusting feet 20, 30, respectively.

Figure 2:
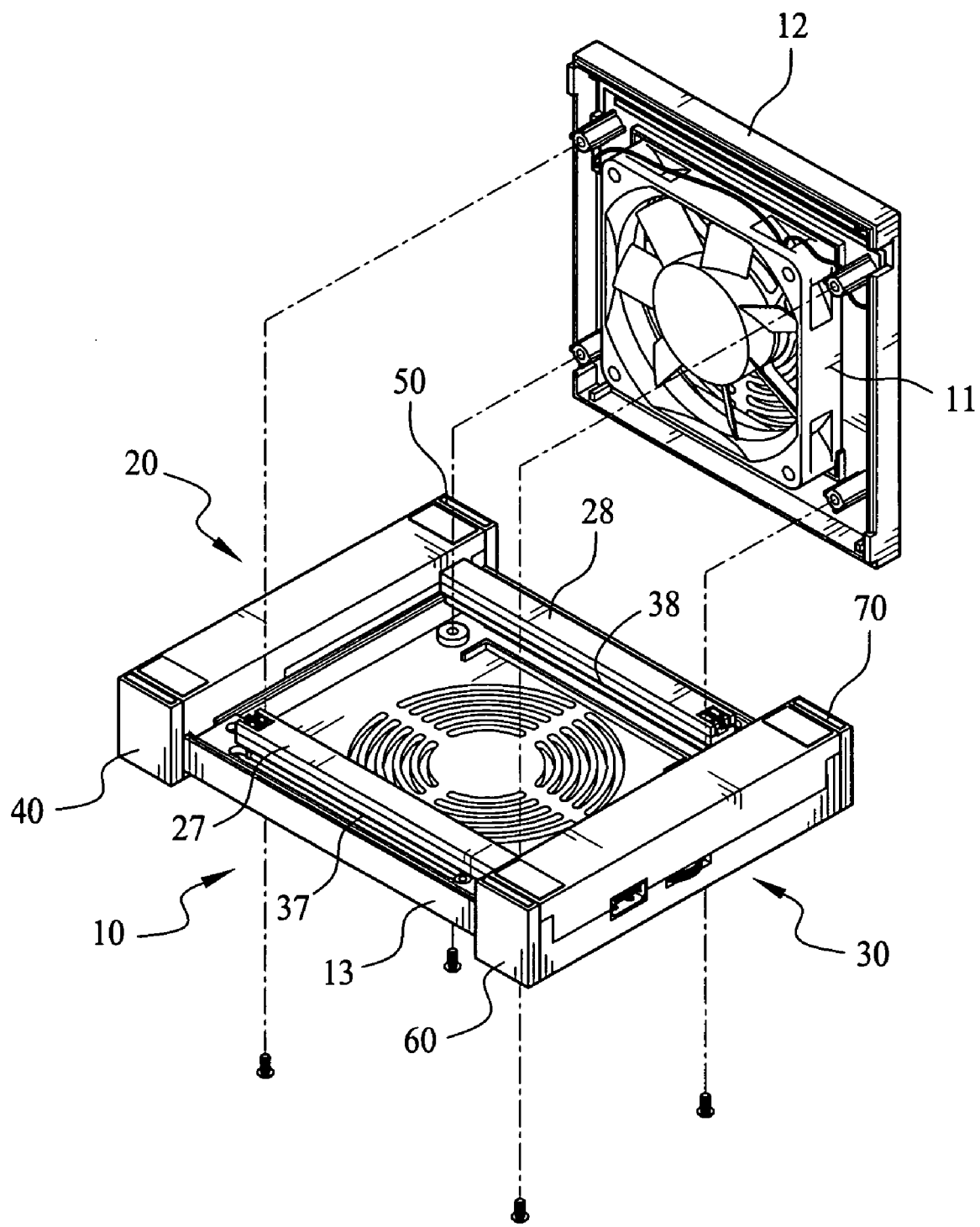
FIG. 2 is a partially exploded perspective view of FIG. 1.
Figure 3:
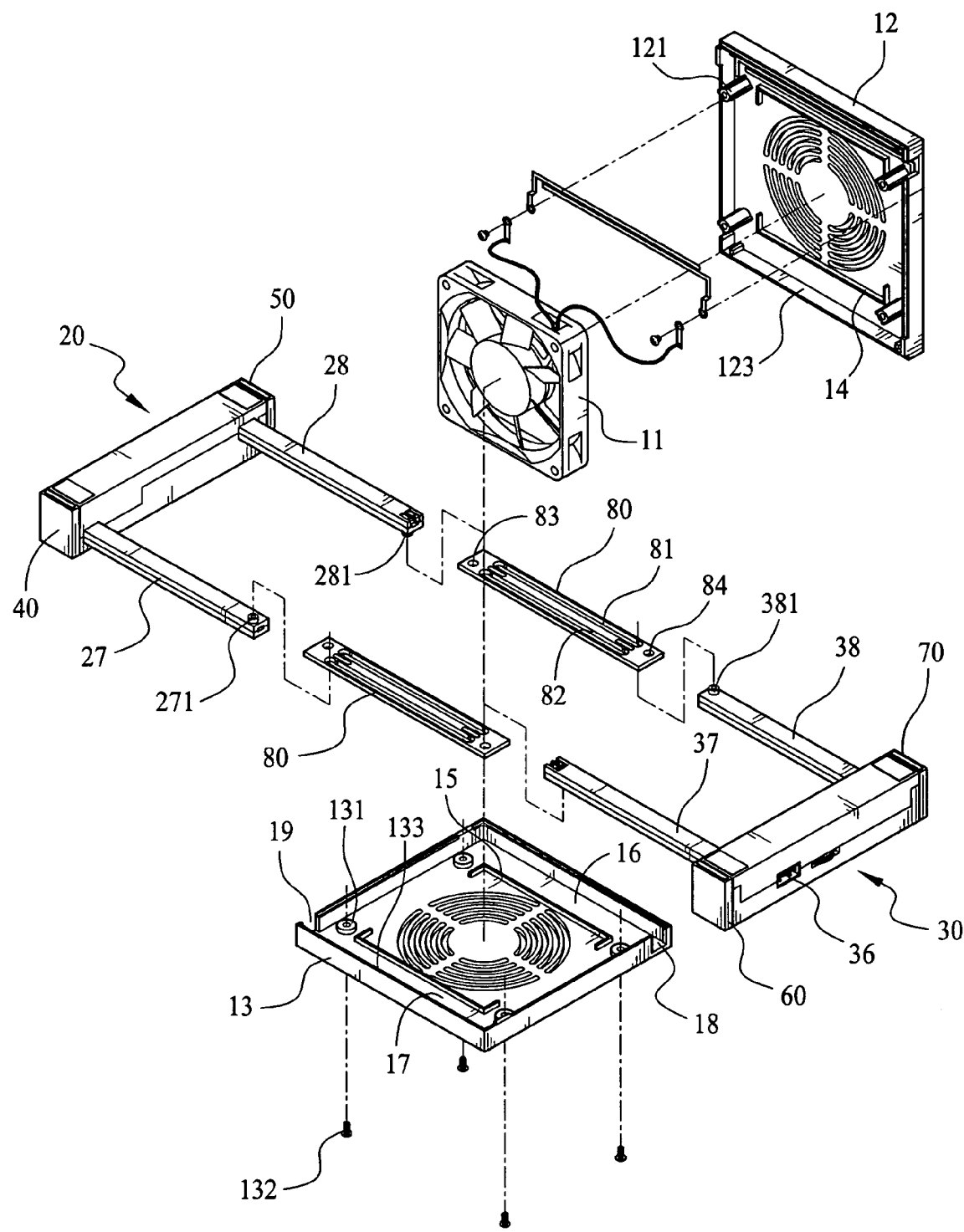
FIG. 3 is a fully exploded perspective view of FIG. 1.

Please refer to FIGS. 2 and 3 that are partially and fully exploded perspective views, respectively, of the present invention. The flat-type cooling fan assembly 10 includes a substantially square cooling fan 11 enclosed in a space defined by and between an upper and a lower cover 12, 13 that are closed to each other. In the illustrated preferred embodiment, the upper and the lower cover 12, 13 are correspondingly provided at respective inner sides with two sets of X-directional ribs 14, 15, which together define a framed space therebetween matching sizes of the cooling fan 11. Two slide ways 16, 17 are formed in the space of the cooling fan assembly 10 separately between each set of ribs 14, 15 and an adjacent X-directional side of the cooling fan assembly 10. Two notches 18, 19 are diagonally formed at two Y-directional sides of the cooling fan assembly 10 to communicate with the slide ways 16, 17, respectively. Meanwhile, the upper and lower covers 12, 13 are locked together by threading bolts 132 through coupling tubes 131 and internally threaded tubes 121 correspondingly provided on the lower and the upper cover 13, 12, respectively.

Two pieces of X-directional slide guides 80 are separately located in the two slide ways 16, 17. In the illustrated embodiment, each of the slide guides 80 includes two parallelly arranged guide slots 81, 82 having a predetermined length, and two through holes 83, 84 provided near two diagonally opposite corners of the slide guide 80. In the illustrated embodiment, each of the two X-directional slide guides 80 is located in X-direction in the flat-type fan assembly 10 between a first plane defined by the corresponding coupling tubes 131 and internally threaded tubes 121 at the same X-directional side of the fan assembly 10 and a second plane defined by inner wall surfaces 123, 133 of the upper and lower covers 12, 13 at the same X-directional side of the fan assembly 10 adjacent to the above-mentioned first plane.

Since the two X-directional adjusting feet 20, 30 are substantially structurally similar to each other, only the X-directional adjusting foot 30 will be described below. Please refer to FIGS. 3, 4, and 5 at the same time. The X-directional adjusting foot 30 consists of an upper and a lower hollow housing 31, 32, which are connected together via complementary coupling elements 391, 392 correspondingly provided at inner sides of the upper and lower housings 31, 32, respectively, to define between them an inner space having suitable dimensions for accommodating necessary electronic elements 33 and a Y-directional slide guide 800 therein. The Y-directional slide guide 800 is structurally similar to the X-directional slide guide 80 and has two parallelly arranged slide slots 801, 802 having a predetermined length, and two through holes 803, 804 provided near two diagonally opposite corners of the Y-directional slide guide 800. The X-directional adjusting foot 30 is also provided at two longitudinally opposite ends at joints of the upper and the lower hollow housing 31, 32 with two insertion openings 34, 35, at an outer side with a socket opening 36, and at an inner side near the two longitudinally opposite ends with high and low sliders 37, 38, respectively, inward extended in X-direction.

The high slider 37 is provided at a lower side near a free end with a downward protrusion 371 adapted to slidably engage with the guide slot 81 on a corresponding X-directional slide guide 80, and the low slider 38 is provided at an upper side near a free end with an upward protrusion 381 adapted to slidably engage with the guide slot 82 on the other X-directional slide guide 80.

Similarly, the X-directional adjusting foot 20 is provided at an inner side near two longitudinally opposite ends with low and high sliders 27, 28, respectively, inward extended in X-direction. The low and high sliders 27, 28 are provided at respective upper and lower side near a free end thereof with upward and downward protrusions 271, 281 (see FIG. 3) adapted to slidably engage with slide ways 82, 81 on corresponding X-directional slide guides 80. With these arrangements, the two X-directional adjusting feet 20, 30 could be pulled outward or pushed inward in X-direction relative to the flat-type cooling fan assembly 10 located between the two adjusting feet 20, 30.

In the preferred embodiment, the X-directional adjusting feet 20, 30 have horizontal bottom surfaces for flatly bearing against a horizontal supporting surface, and horizontal top surfaces for a notebook computer to stably rest thereon. It is noted an overall height of the X-directional adjusting foot 20, 30 is slightly larger than an overall thickness of the flat-type cooling fan assembly 10, so that clearances allowing air circulation are left above an upper surface and below a lower surface of the cooling fan assembly 10 when the adjustable flat-type cooling device is disposed between a notebook computer and a supporting surface.

Figure 4:
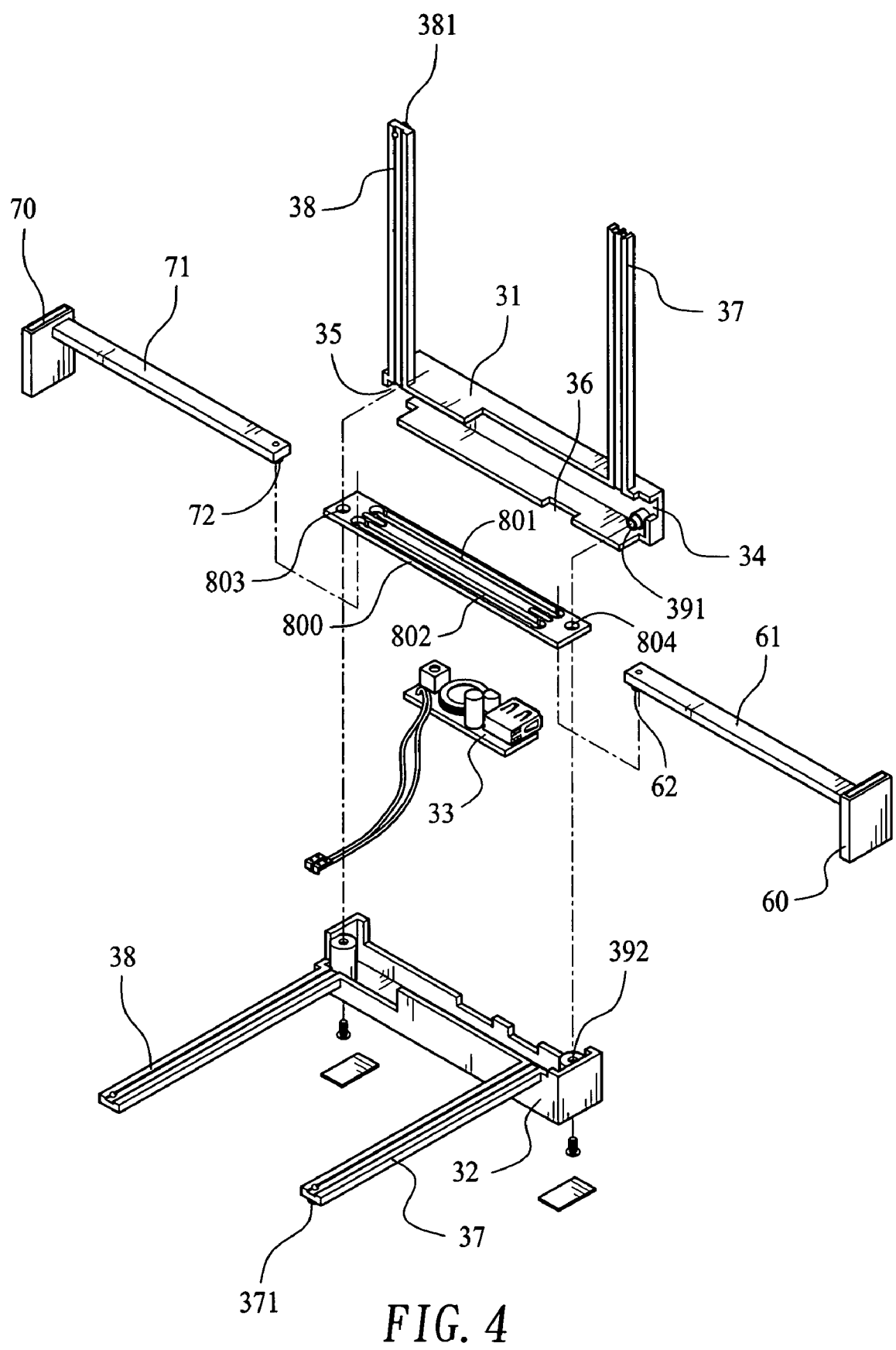
FIG. 4 is a fully exploded perspective view of an X-directional and two Y-directional supporting feet at one side of the present invention.
Figure 5:
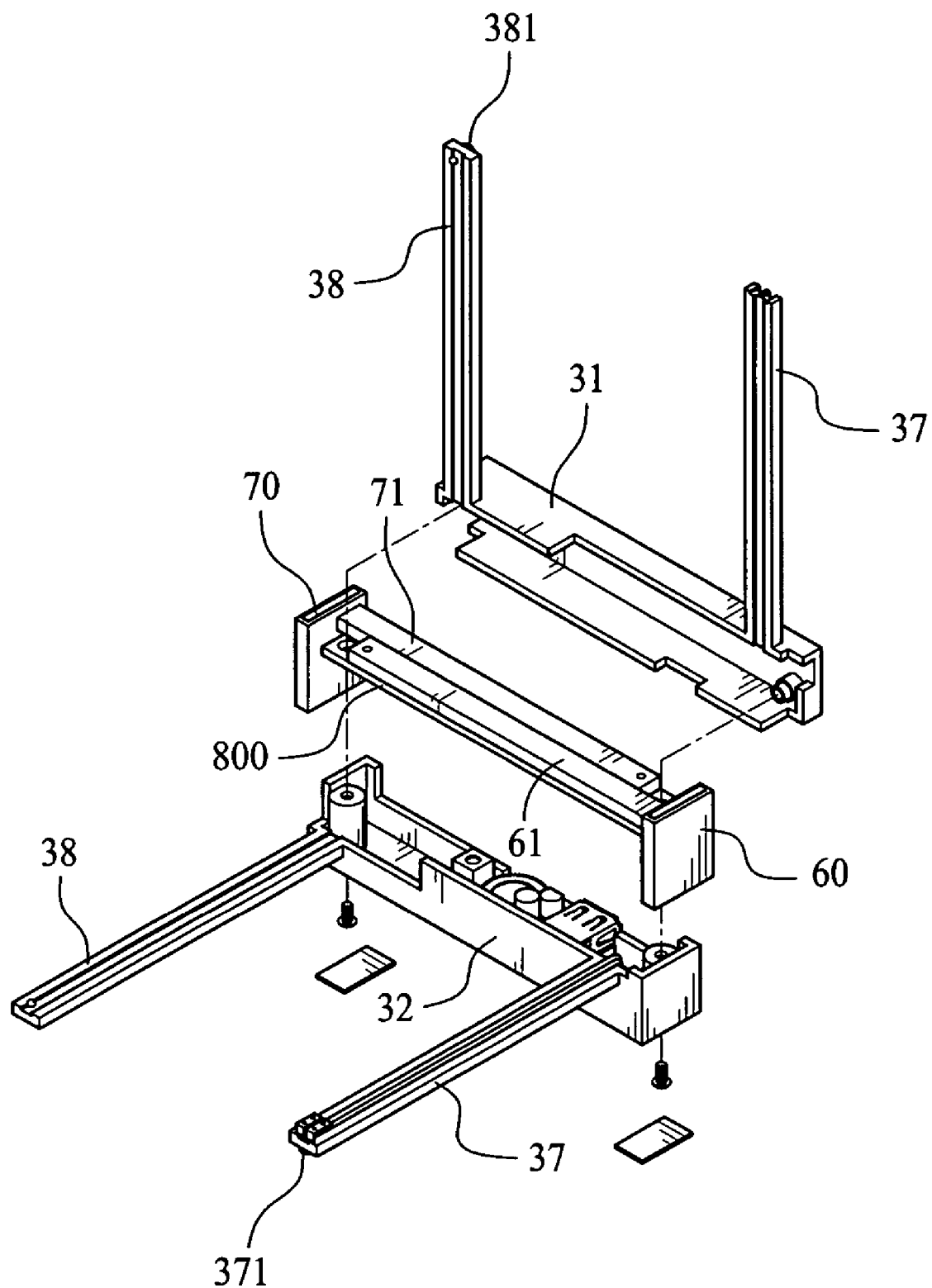
FIG. 5 is a partially assembled perspective view of FIG. 4.

The two sets of Y-directional supporting feet 40, 50 and 60, 70 slidably received in the two X-directional adjusting feet 20, 30, respectively, preferably have the same cross section as that of the X-directional adjusting feet 20, 30. Again, since the two sets of Y-directional supporting feet 40, 50 and 60, 70 are substantially identical to one another, only the Y-directional supporting feet 60, 70 will be described below. As can be seen from FIG. 4, the Y-directional supporting feet 60, 70 respectively include a slider 61, 71 slidably extended into the X-directional adjusting foot 30 via the insertion openings 34, 35, respectively. Protrusions 62, 72 are provided at lower sides near free ends of the sliders 61, 71, respectively, for separately slidably engaging with the guide slots 801, 802 on the Y-directional slide guide 800. The Y-directional slide guide 800 is located in Y-direction in the inner space defined between the upper and lower housing 31, 32 of the X-directional adjusting foot 30 by engaging the two diagonally opposite through holes 803, 804 on the Y-directional slide guide 800 with the coupling elements 391, 392 correspondingly provided in the upper and the lower housing 31, 32, respectively, as shown in FIG. 4.

Figure 6:
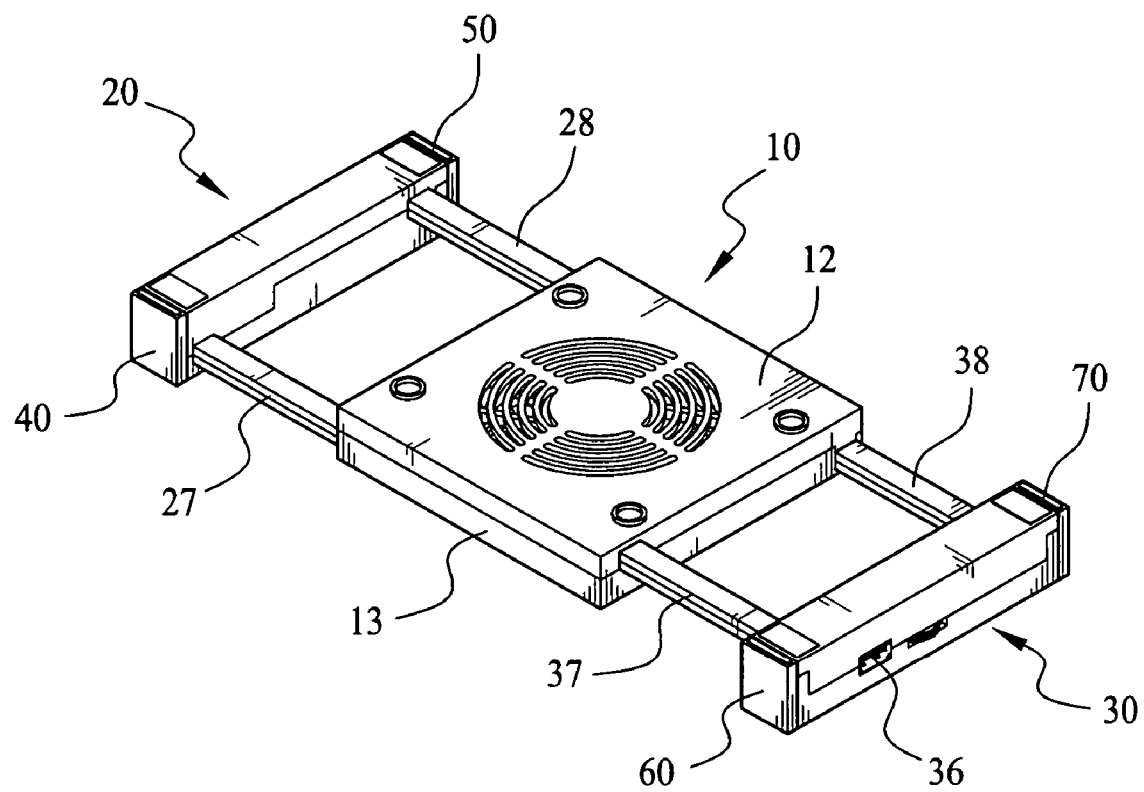
FIG. 6 shows the two X-directional adjusting feet of the present invention are pulled to an extended position.
Figure 7:
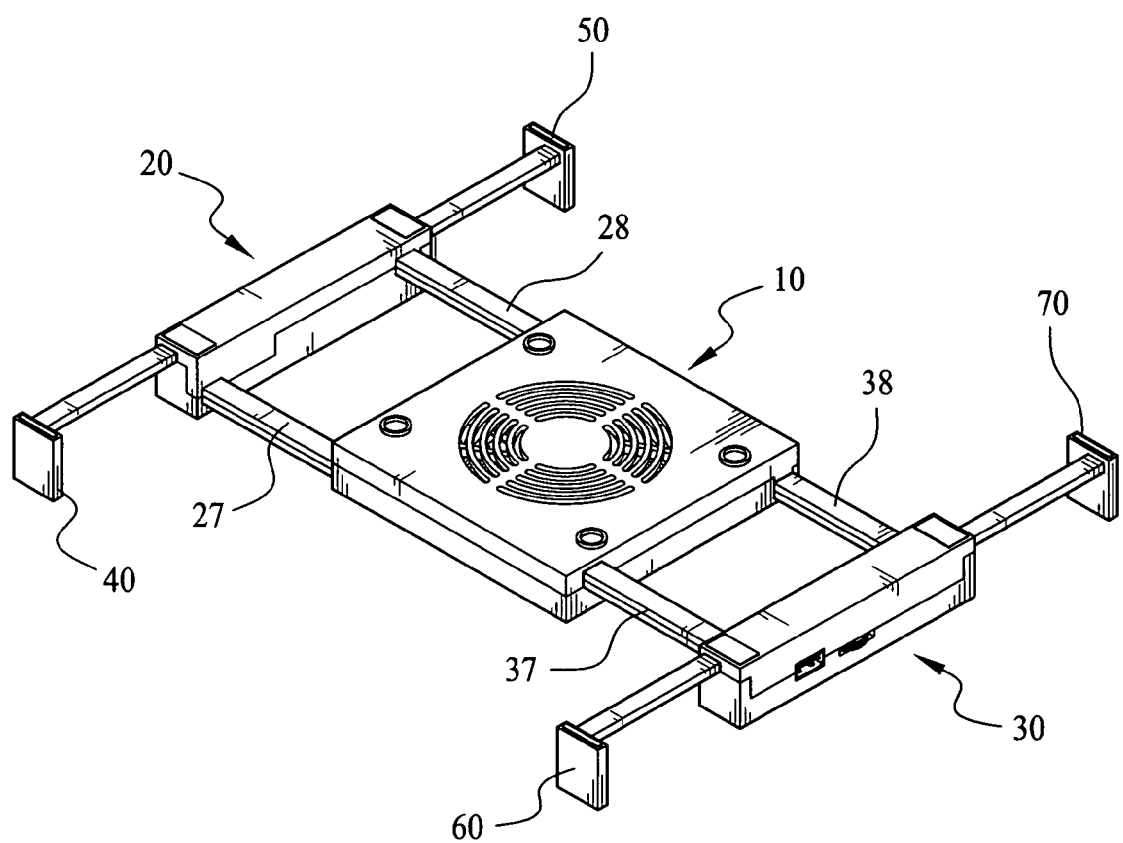
FIG. 7 shows both the X-directional adjusting feet and the Y-directional supporting feet of the present invention are pulled to an extended position.

The X-directional adjusting feet 20, 30 could be fully pushed inward to a retracted position when they are not in use, as shown in FIG. 1, or partially or fully pulled outward to an extended position for use, as shown in FIG. 6. When necessary, the two sets of Y-directional supporting feet 40, 50 and 60, 70 could be further partially or fully pulled outward relative to the X-directional adjusting feet 20, 30 to an extended position, as shown in FIG. 7.

Figure 8:
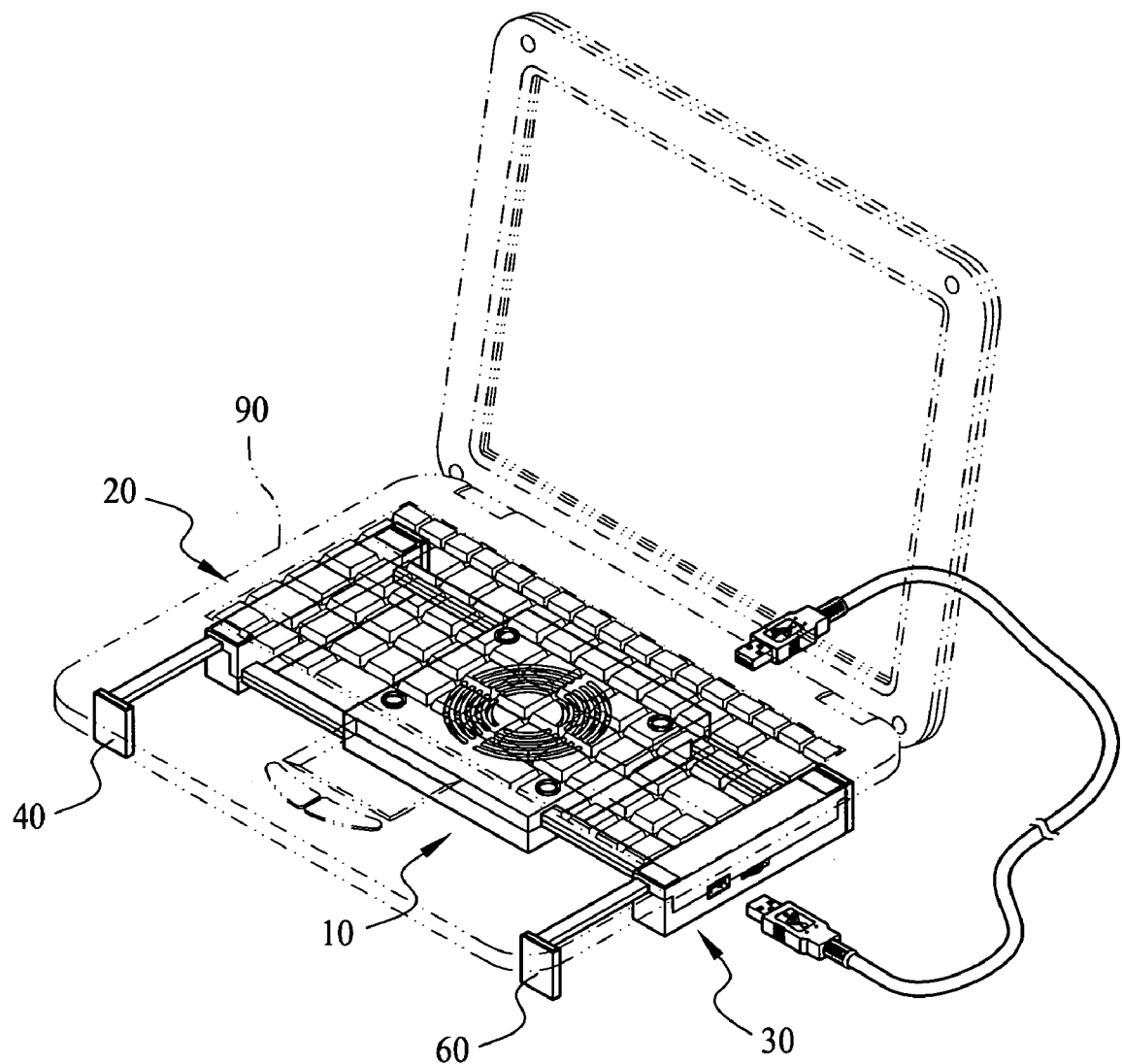
FIG. 8 is a partially phantom view showing the adjustable flat-type cooling device of the present invention is positioned beneath a notebook computer for dissipating heat produced by the notebook computer.

FIG. 8 shows the X-directional adjusting feet 20, 30 and the Y-directional supporting feet 40, 50 and 60, 70 of the adjustable flat-type cooling device of the present invention are in the extended position, and a notebook computer 90 is rested on the whole top surface of the cooling device, so that heat produced by the notebook computer 90 during operation thereof is blown away by the cooling fan of the cooling device. An advantage of the present invention is that a position of the flat-type cooling fan assembly 10 relative to the notebook computer 90 can be adjusted by pulling the X-directional adjusting feet and the Y-directional supporting feet to different extended positions, so that the cooling fan assembly 10 could always be located at a position closest to a heat source of the notebook computer 90 to provide the best cooling effect.

Meanwhile, since only one cooling fan is needed in the cooling fan assembly, the cooling device of the present invention could be manufactured at effectively reduced cost.

The present invention has been described with a preferred embodiment thereof and it is understood that many changes and modifications in the described embodiment can be carried out without departing from the scope and the spirit of the invention that is intended to be limited only by the appended claims.

What is claimed is:

1. An adjustable flat-type cooling device, comprising a flat-type cooling fan assembly, two X-directional adjusting feet symmetrically located at two lateral sides of said cooling fan assembly, and two sets of Y-directional supporting feet slidably received in said two X-directional adjusting feet; bottom surfaces of said X-directional adjusting feet and said Y-directional supporting feet together defining a horizontal bearing plane for resting on a supporting surface, and top surfaces of said X-directional adjusting feet and said Y-directional supporting feet together defining a horizontal plane for a heat-producing apparatus to rest thereon; and a position of said flat-type cooling fan assembly relative to a bottom of said heat-producing apparatus being adjustable by pulling said X-directional adjusting feet and said Y-directional supporting feet to different extended positions.

2. The adjustable flat-type cooling device as claimed in claim 1, wherein said flat-type cooling fan assembly includes an upper and a lower cover closed to each other, and a substantially square cooling fan enclosed in a space defined by and between said upper and said lower cover; said upper and said lower cover being correspondingly provided at respective inner sides with two sets of X-directional ribs, which together define a framed space therebetween matching sizes of said cooling fan, such that a slide way is formed in said cooling fan assembly between each set of said ribs and an adjacent X-directional side of said cooling fan assembly; and said upper and lower covers being respectively provided at two Y-directional sides with two diagonally opposite notches to separately communicate with said slide ways for said two X-directional adjusting feet to insert into said slide ways in said cooling fan assembly via said notches.

3. The adjustable flat-type cooling device as claimed in claim 1, wherein each of said two X-directional adjusting feet includes an upper and a lower hollow housing, which together define between them an inner space having predetermined dimensions for accommodating necessary electronic elements therein; each said X-directional adjusting foot also being provided at two longitudinally opposite ends at joints of said upper and said lower hollow housing with two insertion openings, at an outer side with a socket opening, and at an inner side near said two longitudinally opposite ends separately with a high and a low slider inward extended in X-direction; said high and said low slider being provided near a free end with a downward and an upward protrusion, respectively; and wherein two pieces of X-directional slide guides are separately located in said cooling fan assembly; each of said X-directional slide guides including two parallelly arranged guide slots having a predetermined length, and two through holes provided near two diagonally opposite corners thereof; and said downward and upward protrusions near free ends of said high and low sliders being separately slidably engaged with one of said guide slots on said two X-directional slide guides.

4. The adjustable flat-type cooling device as claimed in claim 3, wherein a Y-directional slide guide is mounted in said inner space defined by said upper and said lower housing of each said X-directional adjusting foot; said Y-directional slide guide being structurally similar to said X-directional slide guides to have two parallelly arranged slide slots of a predetermined length and two through holes provided near two diagonally opposite corners thereof; and wherein each of said Y-directional supporting feet includes a slider that is extended into the inner space of said X-directional adjusting foot via one of said insertion openings provided at two longitudinally opposite ends of said X-directional adjusting foot, and said slider of each said Y-directional supporting foot being provided near a free end with a protrusion for slidably engaging with one of said two parallel slide slots on said Y-directional slide guide.

5. The adjustable flat-type cooling device as claimed in claim 3, wherein said flat-type fan assembly includes two corresponding covers that are locked together by threading bolts through coupling tubes and internally threaded tubes correspondingly provided on said two covers; and wherein each of said two X-directional adjusting feet is located in X-direction in said flat-type fan assembly between a first plane defined by said corresponding coupling tubes and internally threaded tubes at the same X-directional side of said fan assembly and a second plane defined by inner wall surfaces of said upper and lower covers at the same X-directional side of said fan assembly adjacent to said first plane.

6. The adjustable flat-type cooling device as claimed in claim 4, wherein said hollow upper and lower housings of each said X-directional adjusting foot are connected together via complementary coupling elements correspondingly provided at inner sides of said upper and lower housings; and each of said Y-directional slide guides being located in Y-direction in said inner space defined between said hollow upper and lower housing of each said X-directional adjusting foot by engaging said two diagonally opposite through holes on said Y-directional slide guide with said complementary coupling elements correspondingly provided in said upper and said lower housing.

7. The adjustable flat-type cooling device as claimed in claim 1, wherein said X-directional adjusting feet have bottom surfaces adapted to flatly bear against a horizontal supporting surface, and top surfaces suitable for a notebook computer to rest thereon.

8. The adjustable flat-type cooling device as claimed in claim 7, wherein each of said X-directional adjusting feet has an overall height larger than an overall thickness of said flat-type cooling fan assembly, such that clearances allowing air circulation are left above an upper surface and below a lower surface of said cooling fan assembly when said adjustable flat-type cooling device is disposed between said notebook computer and said supporting surface.

\* \* \* \* \*